(12) United States Patent
Lou et al.

(10) Patent No.: US 11,207,932 B2
(45) Date of Patent: Dec. 28, 2021

(54) VEHICLE SUSPENSION SYSTEM AND VEHICLE

(71) Applicant: ZHEJIANG TAOTAO VEHICLES CO., LTD., Lishui (CN)

(72) Inventors: Guidong Lou, Lishui (CN); Weihao Liu, Lishui (CN); Yali Ying, Lishui (CN); Yi Ni, Lishui (CN); Xiaoliang Shi, Lishui (CN)

(73) Assignee: ZHEJIANG TAOTAO VEHICLES CO., LTD., Lishui (CN)

(*) Notice: Subject to any disclaimer, the term of this patent is extended or adjusted under 35 U.S.C. 154(b) by 57 days.

(21) Appl. No.: 16/829,616

(22) Filed: Mar. 25, 2020

(65) Prior Publication Data
US 2021/0188028 A1  Jun. 24, 2021

(30) Foreign Application Priority Data
Dec. 23, 2019  (CN) .......................... 201911336510.5

(51) Int. Cl.
*B60G 3/14* (2006.01)
*B60G 7/00* (2006.01)
(Continued)

(52) U.S. Cl.
CPC ............. *B60G 3/145* (2013.01); *B60G 7/005* (2013.01); *B60G 13/005* (2013.01);
(Continued)

(58) Field of Classification Search
CPC .......... B60G 3/14; B60G 3/145; B60G 7/005; B60G 2200/13; B60G 13/005;
(Continued)

(56) References Cited

U.S. PATENT DOCUMENTS 4,887,829 A * 12/1989 Prince .................... B60G 21/05
                                                    280/282
5,797,607 A *  8/1998 Kopczynski ............ B60G 9/02
                                                    280/5.514
(Continued)

FOREIGN PATENT DOCUMENTS

CH        706111 A2 *  8/2013  ............... B60G 3/14
CN     110154671 A  *  8/2019
(Continued)

OTHER PUBLICATIONS

Marrec, Tiltable Vehicle E.g. Motor Bike, Has Right and Left Posts Respectively Comprising Right and Left Suspensions and Connecting Right and Left Arms With Right and Left Portions of Beam Such That Left Arm Is Driven in Direction, Mar. 28, 2014, EPO, FR 2995869 A1, Machine Translation of Description (Year: 2014).*

*Primary Examiner* — James A English
*Assistant Examiner* — Matthew D Lee
(74) *Attorney, Agent, or Firm* — Muncy, Geissler, Olds & Lowe, P.C.

(57) ABSTRACT

A vehicle suspension system includes a frame, a damper and a rocker arm. The frame is connected with the rocker arm through the damper, the swing part of swing arm limits the swing arm's rotation angle by matching the limit structure on the frame; the bottom of damper is provided with the universal structure, the damper is connected with the rocker arm through the universal structure, and the universal structure controls the damper in free deflection. A deviation motion of vehicle wheels on both ends by coordinating the swing arm, vibration damper, etc. to avoid the slipping and rollover due to great sides way upon vehicle steering and the lateral wheels disengagement from ground and to enhance the safety of cornering driving of vehicles.

18 Claims, 5 Drawing Sheets

(51) Int. Cl.
*B60G 13/00* (2006.01)
*B60G 15/06* (2006.01)
*B60G 13/04* (2006.01)
*B60G 13/08* (2006.01)
*B60G 13/10* (2006.01)
*B62K 3/00* (2006.01)
*B62K 5/02* (2013.01)
*B62K 15/00* (2006.01)
*B62K 5/00* (2013.01)

(52) U.S. Cl.
CPC ............ *B60G 15/068* (2013.01); *B60G 13/04* (2013.01); *B60G 13/08* (2013.01); *B60G 13/10* (2013.01); *B60G 2200/13* (2013.01); *B60G 2202/23* (2013.01); *B60G 2202/24* (2013.01); *B60G 2202/242* (2013.01); *B60G 2204/129* (2013.01); *B60G 2204/416* (2013.01); *B60G 2300/12* (2013.01); *B62K 3/002* (2013.01); *B62K 5/02* (2013.01); *B62K 15/006* (2013.01); *B62K 2005/001* (2013.01)

(58) Field of Classification Search
CPC ...... B60G 15/068; B60G 13/04; B60G 13/08; B60G 13/10; B60G 2202/23; B60G 2202/24; B60G 2202/242; B60G 2204/129; B60G 2300/122; B60G 2300/45; B62K 5/10; B62K 5/027
See application file for complete search history.

(56) References Cited

U.S. PATENT DOCUMENTS

| | | | |
|---|---|---|---|
| 7,665,742 B2 * | 2/2010 | Haerr | B62K 5/027 280/5.508 |
| 2006/0255550 A1 * | 11/2006 | Pfeil | B62K 5/05 280/5.509 |
| 2017/0088221 A1 * | 3/2017 | Ohno | B62K 5/10 |

FOREIGN PATENT DOCUMENTS

| | | | | |
|---|---|---|---|---|
| CN | 211364186 U | * | 8/2020 | |
| FR | 2995869 A1 | * | 3/2014 | ............. B62K 5/027 |
| NL | 1012764 C1 | * | 9/1999 | ............. B60G 21/05 |
| WO | WO-2005058680 A1 | * | 6/2005 | ............. B62K 5/08 |
| WO | WO-2013051493 A1 | * | 4/2013 | ............. B62K 5/06 |

* cited by examiner

VEHICLE SUSPENSION SYSTEM AND VEHICLE

CROSS-REFERENCE TO RELATED APPLICATIONS

This Non-provisional application claims priority under 35 U.S.C. § 119(a) on Chinese Patent Application No(s). 201911336510.5 filed on Dec. 23, 2019 the entire contents of which are hereby incorporated by reference.

BACKGROUND OF THE INVENTION

Field of the Invention

This invention belongs to a technical field of a vehicle suspension device, and s more particularly, to a vehicle suspension system and a vehicle.

Description of the Related Art

The suspension is the generic term of all power transmission connection devices between the vehicle's frame and the axle or vehicle wheels. Most of the vehicle suspension systems are composed of the elastomeric component, vibration damper, guide mechanism, etc. which play the role in the buffer, vibration attenuation and power transmitting, respectively. The independent suspension system and the dependent suspension system could be divided as per different structures: The independent suspension system is directly and rigidly connected to the vehicle wheels on both sides with a rod piece, and the vehicle wheels on one side would inevitably influence that on other side when receiving the impulse and vibration. Hence, the handling stability and comfort are low. In the meantime, the stability of vehicle body is influenced easily due to the mutual influence of vehicle wheels on the left and right, and the roll easily happens upon steering. In the dependent suspension system, the vehicle wheels on both sides of vehicle dependently is connected with the vehicle body, hence the elastomeric component could absorb the impulsive force when the vehicle wheels on one side receives the impulse and vibration. Such impulse wouldn't affect the vehicle wheels on the other side to improve the vehicle's riding comfort, stability and handling stability.

The current scooter, dune buggy, kart racing and other functional vehicles have higher requirements in driving experience. Most of them adopt the independent suspension system, while the Macphersan-type independent suspension is widely used due to simple structure, small space occupation, quick response and low manufacturing cost, but it is small in the lateral stiffness, poor in stability and great in cornering sides way, which reduces the safety of vehicle's steering operation in high-speed driving process to some extent. Under normal circumstance, the vehicle wheels will leave the ground when the frame deflects for about 5°, so great potential safety hazards exist.

The double-wishbone suspension system could keep the vehicle wheels contact with the ground as far as possible through deflection of vehicle wheels in the vertical direction to some extent, thus enhancing the stability of automobile driving and reducing the skidding and rollover risk upon cornering to some extent. However, the double-wishbone suspension system has a high cost and complex structure, and occupies large space in the small vehicle.

BRIEF SUMMARY OF THE INVENTION

In order to solve the above problems, this invention provides a suspension system with simple structure and small volume, which can increase the contact area with the ground when a vehicle turns or deflects, enhance a stability of the vehicle and improve the vehicle driving safety, specifically realized by the following technical schemes: A vehicle suspension system includes a damper and a rocker arm, wherein the frame is connected with the rocker arm, the frame is also connected with the rocker arm by the damper, the system further includes a swing arm and a limiting structure both disposed at the frame; a top of the damper is connected with the frame through the swing arm, a fixing part of the swing arm is hingedly connected with the frame, and a swing part of the swing arm cooperates with the limiting structure on the frame to define a rotation angle of the swing arm; a bottom of the damper is provided with a universal structure, the damper is connected with the rocker arm through the universal structure, and the universal structure controls the damper in a free deflection.

Optionally, the suspension system may also include a vehicle wheels, and both ends of the rocker arm are hinged with the frame and the vehicle wheels, respectively.

Optionally, the vehicle wheels and the damper are respectively disposed at both sides of the rocker arm.

Optionally, the universal structure includes a ball rod and a spherical shell, the ball rod and the spherical shell are disposed at the bottom of the damper, the ball rod and the spherical shell coordinate in connection, and the spherical shell and the rocker arm are fixed connected.

Optionally, the universal structure and the rocker arm are connected near a connection position of the rocker arm and the vehicle wheels, which could make the transmission efficiency of a motion state of the vehicle wheels and the damper higher.

Optionally, the damper is a spring damper, a rubber damper, a hydraulic damper, an inflatable damper or a damper with adjustable resistance.

Optionally, the swing part is a limiting rod, the limiting structure is a limiting hole, and the limiting rod inserts into the limiting hole to limit an angle of the swing arm.

Optionally, the swing part is a limiting hole, the limiting structure is a limiting rod, and the limiting rod inserts into the limiting hole to limit an angle of the swing arm.

Optionally, the swing part and the limiting structure adopt a gear for a limiting connection. The gear is used to limit, enhancing a mechanical strength of the swing arm.

Optionally, the swing part and the limit structure adopt a rotating shaft for the limit connection.

Optionally, the buffer structure is disposed at a joint of the swing part and/or the limit structure with the above-mentioned limit connection, preventing an impact of deflection from affecting the service life of the swing part and/or the limiting structure, and avoiding a generation of large noise.

Optionally, the buffer structure is a spring or a rubber.

Optionally, the angle of the swing arm deviating from both sides in a vertical direction when moving is less than or equal to 30°. If the deflection is too large, the vehicle's gravity deviation angle is too large, affecting a stability of the vehicle body.

For example, some special vehicles could adopt a relatively large deflection angle.

Optionally, the angle of the swing arm deviating from both sides in a vertical direction when moving is less than or equal to 20°. General people could drive more stably by adopting a relatively small deflection angle.

Optionally, a top of the damper is movable connected with the swing arm are optional.

Optionally, the top of damper and the swing arm could be connected by a ball rod and a spherical shell structure. If the spherical shell is set at the swing arm, the corresponding top of the damper is set as the ball rod; or if the ball rod is set at the swing arm, the spherical shell is set at the corresponding top of the damper. It makes the swing arm more convenient when deflection and the deflecting transmission effect is better.

Optionally, the damper is a spring damper, the spring damper is provided with a coil spring, and both ends of the coil spring are provided with spring caps, respectively.

Two ends of the coil spring at the damper are respectively provided with spring caps, respectively. The spring cap is movably connected to the damper, and the top of the damper is provided with a cap nut. The coil spring structure is simpler and not easy to be aged. The model and parameters of the coil spring are more widely and conveniently selected.

Optionally, both ends of the swing arm are disposed between the spring cap and the cap nut at a top of the spring damper.

This invention also provides a vehicle includes at least one above-mentioned vehicle suspension system. The system could be adopted by two front wheels or two rear wheels, or both front wheels and rear wheels. It could be used in the automobile, dune buggy, kart racing, snowmobile, electric vehicle, scooter, balance car, etc.

Optionally, when the front wheels and the rear wheels of the vehicle adopts the above-mentioned vehicle suspension system, a deflection angle of the suspension system of the front wheels could be the same as or different from that of the rear wheels. For example, the suspension system of the front wheels could turn to the left and right for 10°, respectively, the suspension system of the rear wheels could turn to left and right for 20°, respectively.

Optionally, the above-mentioned vehicle suspension system is applied in a rear wheels of the vehicle. Most of existing vehicles are driven by the front wheels, and are complex in structure and more tedious in refitting. When turns, the vehicle is generally easy to reduce an adhesion between an outside of the rear wheels and the ground, or even suspension, so when applied to the rear wheels, the effect is more obvious.

Optionally, the above-mentioned vehicle suspension system is used in a driven wheels of the vehicle. The complexity of driving wheels refitting could be reduced.

Compared with the existing technology, this invention connects the deflection motion states of the vehicle wheels at both ends through the swing arm, which can avoid a slipping and a rollover due to the outside wheels does not contact the ground in case of a large rolling angle when turning in a Macphersan suspension system, then enhancing the safety of cornering driving of vehicles. Through a cooperation of the ball rod and the spherical shell, a deflecting force at one side of the vehicle wheels when deflected could be transmitted to the swing arm at the frame better, and change a deflection state of vehicle wheels at the other side through a rotation of the swing arm. The vehicle wheels could be pressed on the ground tightly through an application of an elastomeric components at the damper such as spring, etc. ensuring a stable operation. In the suspension system of existing technology, the bottom of the damper is fixed at the swing arm with a bolt or in other similar methods so that the damper could only move in a axial direction or a up-and-down direction. The universal structure could control a free deflection of the damper to guarantee a rotation of the swing arm isn't impeded by the damper in the direction better.

The above-mentioned the universal structure uses the ball rod and the spherical shell structure to make the damper can not only move in the axial direction, but also make the damper rotate at a certain angle in many directions while playing the role of shock absorber. The ball rod and the spherical shell coordinate to ensure both sides of the swing arm could swing up and down without being restricted by the frame structure.

This invention could also be improved in a similar structure of Macphersan suspension, with simple structure and small volume, and is more suitable for small vehicle and has a relatively low cost compared with the double-wishbone suspension system.

Figure 1:
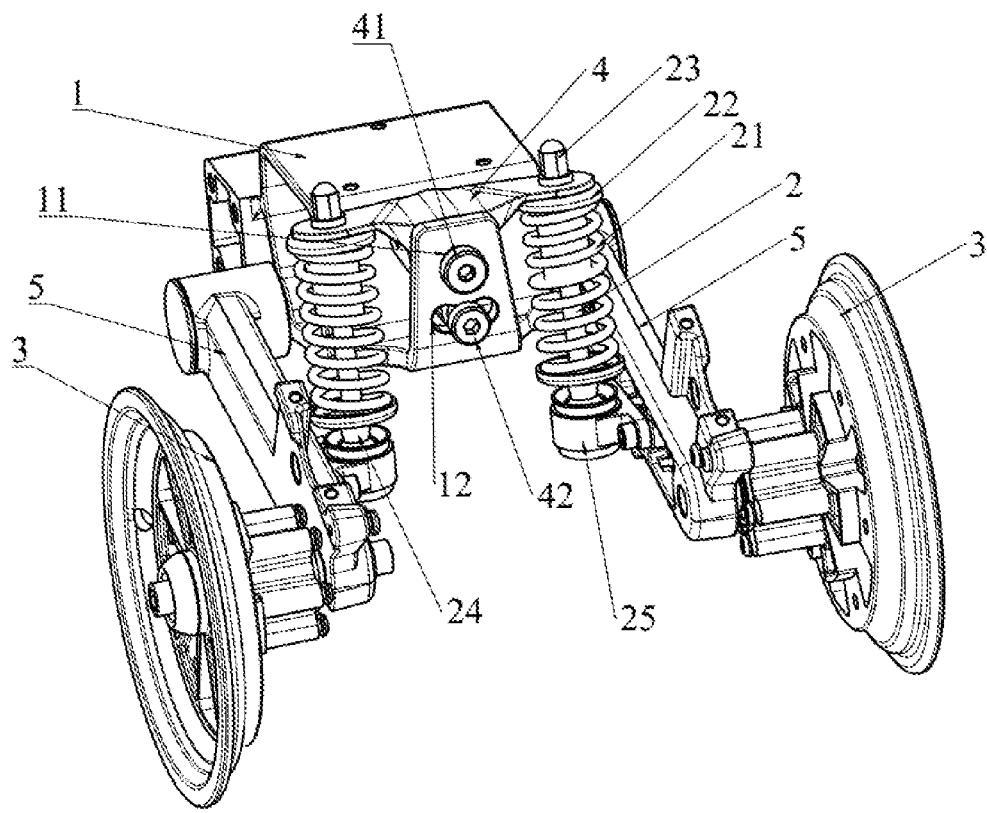
FIG. 1 shows a three-dimensional structure diagram of a vehicle suspension system in embodiment one of this invention.
Figure 2:
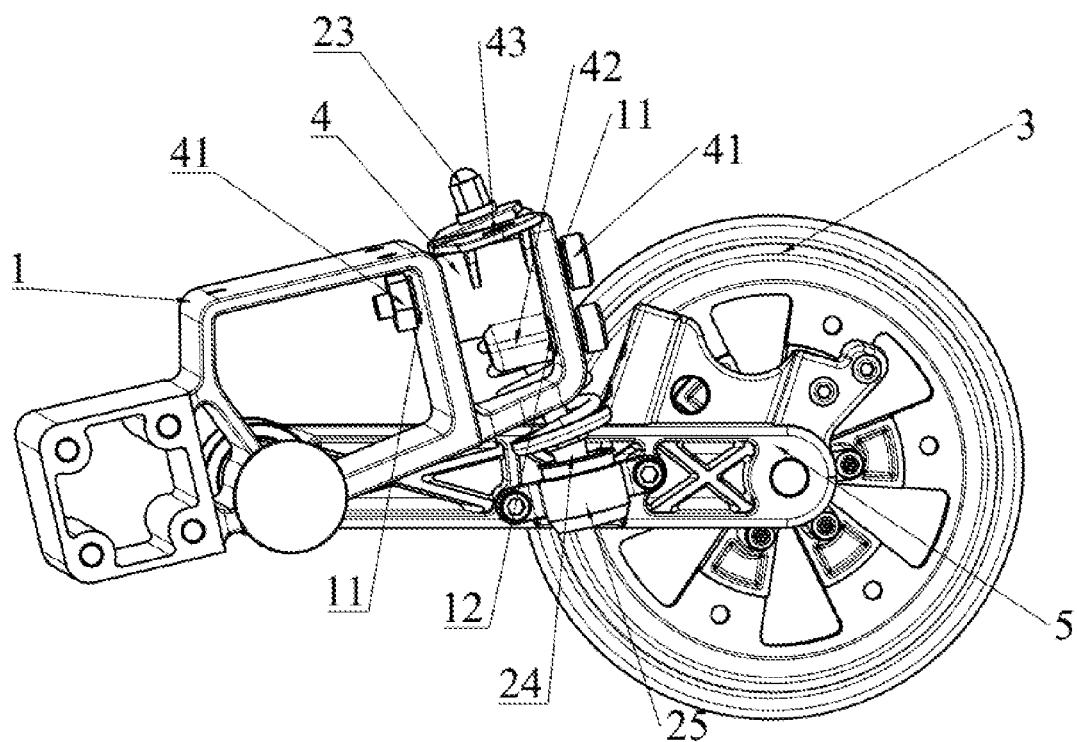
FIG. 2 shows a side direction structure diagram of the vehicle suspension system in embodiment one of this invention.
Figure 3:
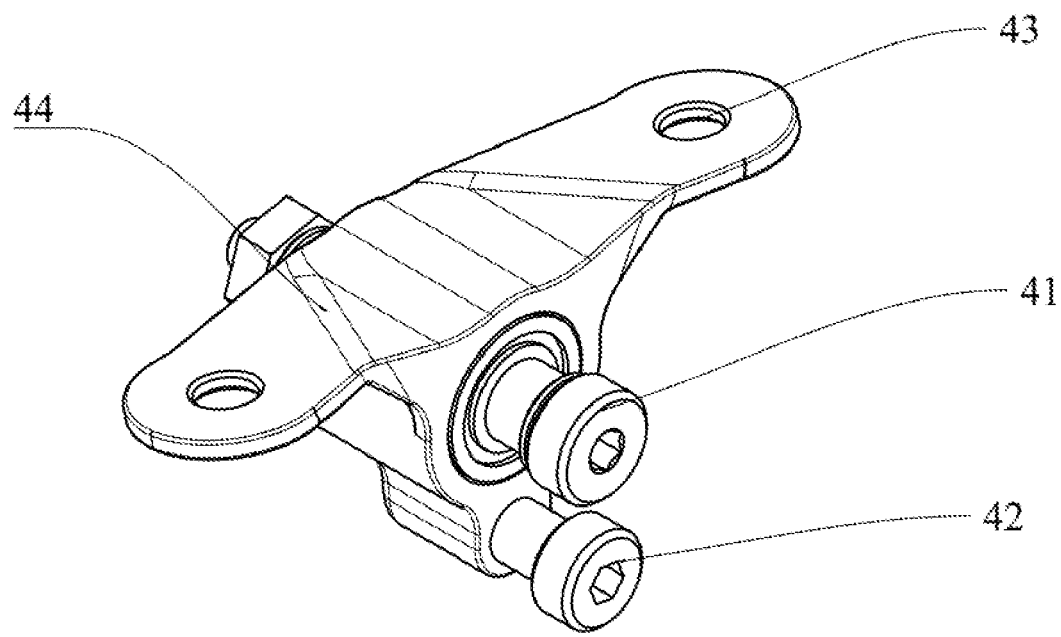
FIG. 3 shows a swing arm structure diagram of the vehicle suspension system in embodiment one of this invention.

Attached Figures are labeled as follows: 1—frame, 11—swing arm fixing hole, 12—limiting hole, 13—front fork arm, 14—empennage, 15—tail light, 16—latch hook, 2—damper, 21—coil spring, 22—spring cap, 23—cap nut, 24—ball rod, 25—spherical shell, 26—protruding structure, 27—fixing connection hole, 3—vehicle wheels, 31—disc brake structure, 4—swing arm, 41—fixing part, 42—limiting rod, 43—through-hole, 44—swing structure, 5—rocker arm, 6—pedal, 61—power module, 7—drive assembly, 8—handle assembly, 81—brake handle, 82—latch structure.

DETAILED DESCRIPTION OF THE INVENTION

The specific implementation method of this invention is specifically expounded as follows by combining specific embodiments. It shall be noted that the protection scope of this invention is not limited to the following embodiments:

Embodiment One

A vehicle suspension system as shown in FIGS. 1~8 includes a frame 1, a damper 2, a vehicle wheels 3, a swing arm 4 and a rocker arm 5. The frame 1 is hingedly connected with the rocker arm 5, and the rocker arm 5 is hingedly connected with the vehicle wheels. The frame 1 is provided with the swing arm 4 of a wing structure and is movably connected to a top of the damper 2 through the swing arm 4. The frame 1 is provided with a swing arm fixing hole 11 and a limiting hole 12, and the damper 2 is provided with a coil spring 21. Both ends of the coil spring 21 are provided with a spring cap 22, the top of damper 2 is provided with a cap nut, and a bottom of the damper 2 is provided with a ball rod 24 and a spherical shell 25 matched with the ball rod 24. An upper portion of the spherical shell 25 is provided with a protruding structure 26 used to limit a maximum rotation angle of the ball rod 24, and a side of the spherical shell 25 is provided with two fixing connection holes. The damper 2 is connected with the rocker arm 5 through the two fixed connection holes 27. The swing arm 4 includes a fixing part 41, a swing structure 44, a limiting rod 42 and through-holes 43 at both ends of the swing structure 44.

Figure 4:
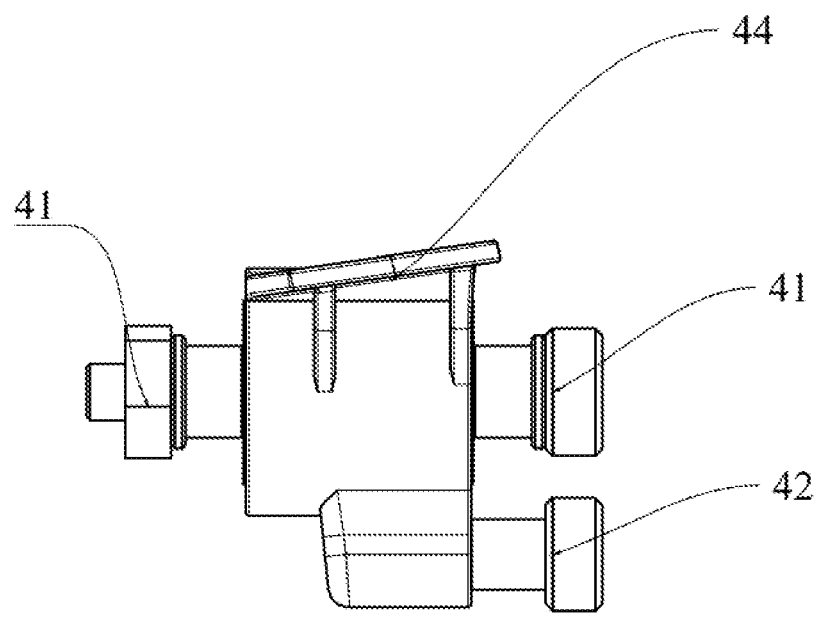
FIG. 4 shows a left view of the swing arm in the vehicle suspension system in embodiment one of this invention.

The swing structure 44 is a wing-shaped structure. Both two sides of the swing structure form an acute angle with a horizontal direction, and an opening direction of the acute angle is toward the vehicle wheels 3 or one side of the damper 2, as shown in FIG. 4. The damper 2 is connected with the vehicle wheels 3 through the rocker arm 5. In general condition, there is a certain angle between an axial direction of the damper 2 and a vertical direction. The top of the damper 2 is inclined to the frame 1, and the bottom of damper 2 is inclined to the vehicle wheels 3, so the angles disposed at both sides of the swing structure 44 are more conductive to a connection with the damper 2, and reduces a resistance brought by the swing structure 44 when the damper 2 works.

A distance between the through-holes 43 on both sides and the fixing part 41 is greater than a distance between the limiting rod 42 and the fixing part 41. Under a condition of guaranteeing the same rotation angle, small movement distance of the limiting rod 42 is convenient for reducing a movement range of the limiting rod 42.

A distance between the through-holes 43 on both sides of the swing arm 4 is defined by the wing-shaped structure, the longer the distance is, the greater a ratio of a movement distance of the through-holes 43 on both sides to a movement distance of a joint between the swing arm 4 and the fixing part 41 is. Hence, a motion state could be transmitted between both sides of the vehicle wheels 3 by setting the through-holes 43 on both sides at a wing-shaped end so as to be able to deflect a larger angle on the vehicle wheels 3 on both sides, reducing a size of the whole swing arm 4 as much as possible.

The swing arm 4 is fixed at the frame 1 through the coordination hinge of the fixing part 41 and the swing arm fixing hole 11, the fixing part 41 is a hinge axle and the limiting rod 42 is installed inside the limiting hole 12; The swing arm 4 is set between the spring cap 22 and the cap nut 23 through the movable connections of through-hole 43.

The limiting hole 12 is an arc slot and cooperates with the limiting rod 42, an angle between the swing angle at both sides of the swinging arm 4 and the vertical direction is defined to be 20°. The vertical direction mentioned in this invention is a wire connection of the fixing part 41 and the limiting rod 42 when the vehicle wheels 3 and swing arm 4 on both sides have no deflection upon normal driving.

Figure 5:
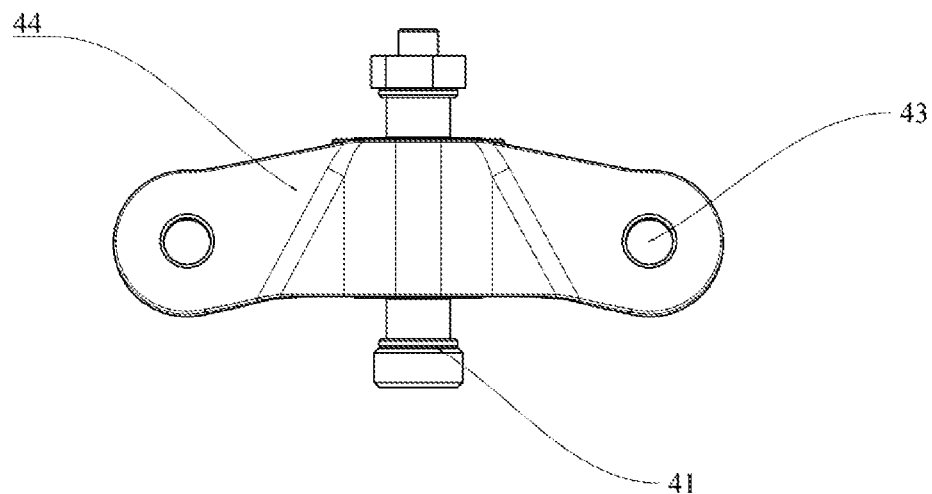
FIG. 5 shows a top view of the swing arm in the vehicle suspension system in embodiment one of this invention.
Figure 6:
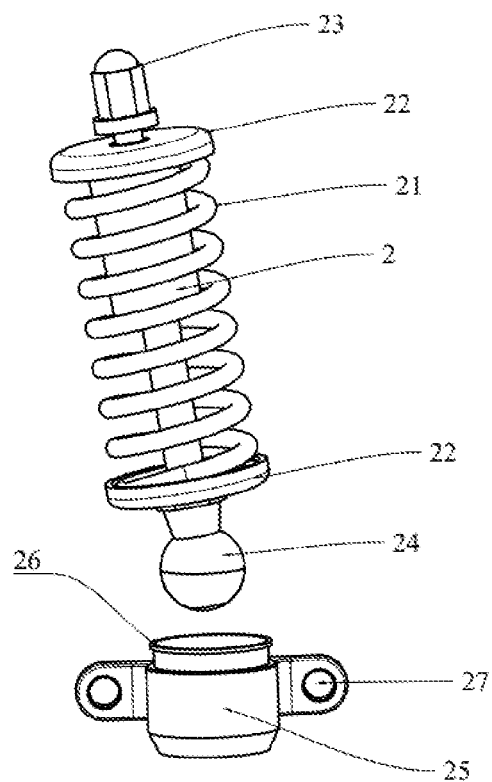
FIG. 6 shows a damper structure diagram of the vehicle suspension system in embodiment one of this invention.
Figure 7:
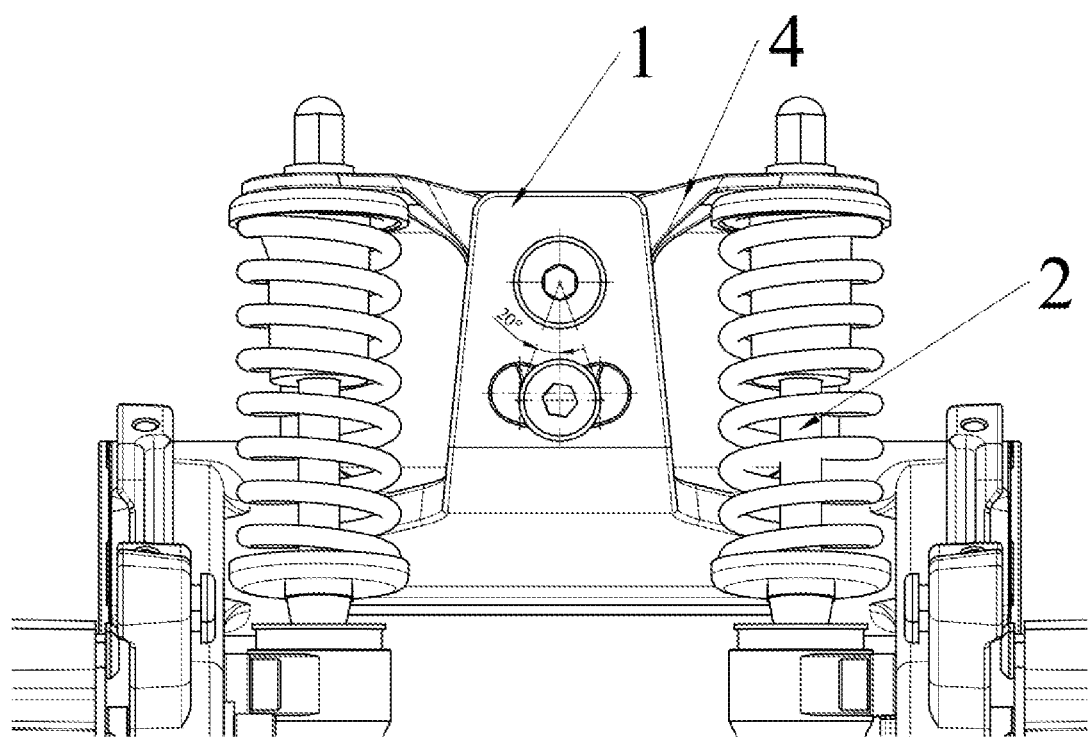
FIG. 7 shows a deflection angle of a limiting structure diagram of the vehicle suspension system in embodiment one of this invention.

When the vehicle turns left or causes the frame 1 to deflect left as shown in FIG. 5, the frame 1 turns left to drive the rocker arms 5 on both sides to be deflect to the left, then the rocker arms 5 on both sides drive the vehicle wheels 3 on both sides to be deflect to the left. At that time, a support point of the vehicle is at the vehicle wheels 3 on the left. Since the vehicle wheels 3 on the left side and the spherical shell 25 on the left are on both sides of the left rocker arm 5, the spherical shell 25 on the left moves up when the vehicle wheels 3 on the left presses down, and the damper 2 on the left supports upward and the through-hole 43 on the left side rises and controls the whole swing arm 4 in rotation to the right side through the fixing part 41, and the through-hole 43 on the right side presses down. At this time, the limiting rod 42 is on the left side of the limiting hole 12, the coil spring 21 on the right could generate certain a compressive deformation by pressing down the damper 2 on the right, and the pressure transmitting to the damper 2 on the right is applied to the spherical shell 25 on the right through the damper 2 on the right. The vehicle wheels 3 on the right turns to the left under the action of the rocker arm 5 on the right side and is pressed down by the pressure and is close to the ground. Thus, a probability of slipping or turning the vehicle due to the fact that the wheels 3 on the right is off the ground when the vehicle is tilted to the left is reduced, and the vehicle turning safety is further improved.

When the vehicle turns right or causes the frame 1 to deflect right, the suspension system change is opposite to the deflection to the left. Finally, the vehicle wheels 3 on both sides turns to the right, and the vehicle wheels 3 on the left is pressed on the ground.

In the suspension system of existing technology, the bottom of the damper 2 is fixed at the swing arm 5 with a bolt or in other similar methods so that the damper 2 could only move in a axial direction or a up-and-down direction. The universal structure uses the ball rod 24 and the spherical shell 25 structure to make the damper 2 can not only move in the axial direction, but also make the damper 2 rotate at a certain angle in many directions while playing the role of shock absorber.

Embodiment Two

Figure 9:
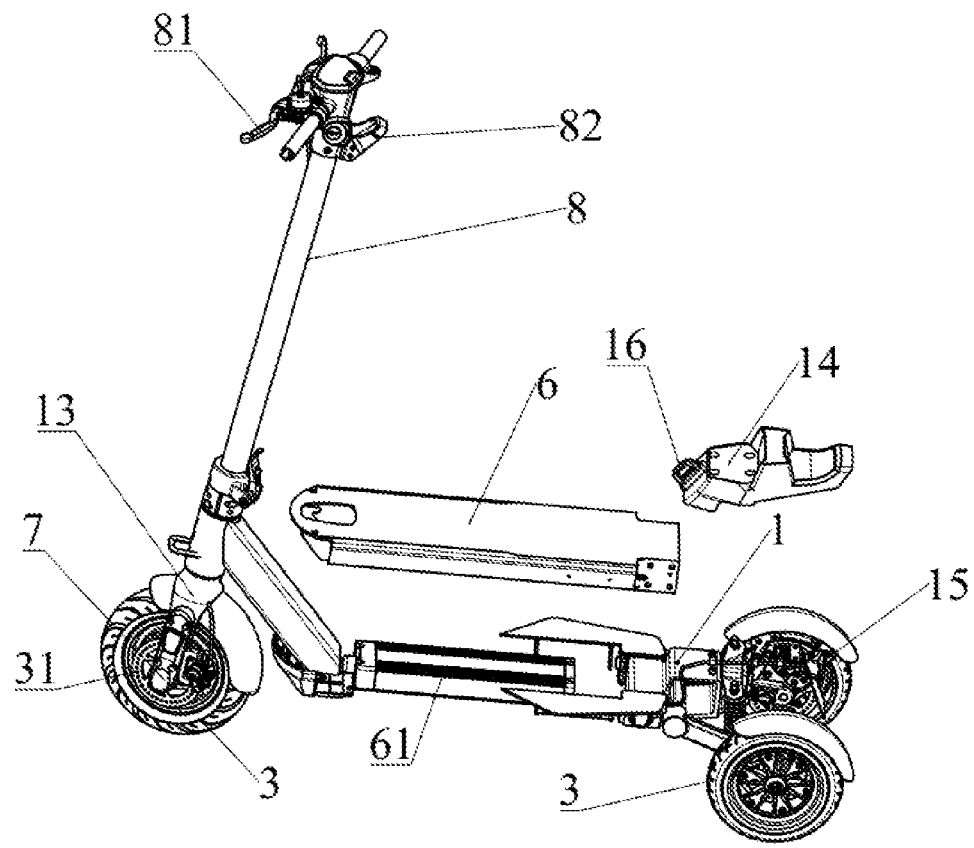
FIG. 9 is a structure diagram of a scooter in embodiment two of this invention.
Figure 10:
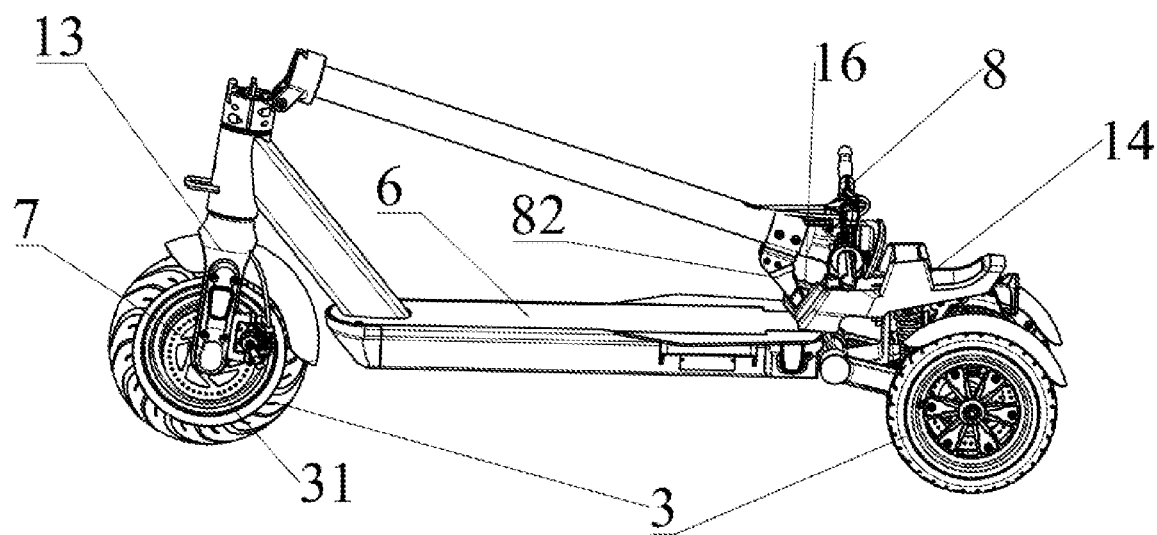
FIG. 10 is a state diagram of the scooter in embodiment two of this invention after folding.

A scooter as shown in FIGS. 9 and 10 includes a frame 1, a pedal 6 and several vehicle wheels 3. The frame 1 of the scooter in this embodiment is a rear axle and a front axle. The front axle in the scooter is a front fork arm 13, and one vehicle wheel 3 is set below the front fork arm 13 as a front wheel. The frame 1 is connected with two vehicle wheels 3, and the front fork arm 13 is connected with the frame 1 through the pedal 6. The pedal 6 is provided with a power module 61, and the power module 61 is connected with a drive assembly 7 and a handle assembly 8, respectively. The handle assembly 8 has the folding connection with the front fork arm 13. The drive assembly 7 is set on the vehicle wheel 3 below the front fork arm 13, and the power module 61 drives an operation of the vehicle wheels 3 of the front fork arm 13 by controlling the drive assembly 7. The handle assembly 8 could be provided with a brake handle 81, an indicator light, a code table, a displayer and other devices as per the demand for braking, providing illumination and observing the current speed and electric quantity of the scooter, and the like. The upper surface of the pedal 6 is provided with a non-slip mat, the empennage 14 and the tail light 15 are equipped behind the frame 1, and a latch hook 16 is equipped at the empennage 14. The latch hook 16 coordinates with the latch structure 82 disposed at the handle assembly 8, and the latch structure 82 and the latch hook 16 are buckled up upon folding. A bar at the handle assembly 8 is carried when carrying. The vehicle wheel 3 below the front fork arm 13 and two vehicle wheels 3 connected by the frame 1 both are provided with a disc brake structure 31, the disc brake structure is controlled through the brake handle 81 on the handle assembly 8.

The suspension system is equipped at the frame 1, which is the same as the structure in FIG. 1~8 of Embodiment 1. The suspension system includes a damper 2 and a rocker arm 5. Two ends of the rocker arm 5 are hingedly connected to the frame 1 and the two vehicle wheels 3, respectively. The frame 1 is also connected with the rocker arm 5 through the damper 2, the frame 1 is provided with a wing-shaped swing arm 4 through which the swing arm 4 is movably connected with the top of damper 2; The frame 1 is provided with a swing arm fixing hole 11 and a limiting hole 12, the damper 2 is provided with a coil spring 21, both ends of the coil spring 21 are provided with a spring cap 22, the top of the damper 2 is provided with a cap nut, the bottom of the damper is provided with a ball rod 24 and a spherical shell 25 matched with the ball rod 24, the top of the spherical shell 25 is provided with a protruding structure 26 used to restrict a maximum rotation angle of the ball rod 24, a side wall of the spherical shell 25 is provided with two fixing connection holes, and the bottom of the damper 2 is connected with the rocker arm 5 through a fixing connection hole 27. The swing arm 4 includes a fixing part 41, a swing structure 44, a limiting rod 42 and a through-hole 43 at both ends of the swing structure 44. The swing arm 4 is hingedly fixed at the frame 1 through the coordination of the fixing part 41 and the swing arm fixing hole 11, the fixing part 41 is a hinge axle and the limiting rod 42 is installed inside the limiting hole 12; The swing arm 4 is movably set between the spring cap 23 and the cap nut 22 through the through-hole 43.

The limiting hole 12 is an arc slot and cooperates with the limiting rod 42, an angle between the swing angle at both sides of the swinging arm 4 and the vertical direction is defined to be 20°. The vertical direction mentioned in this invention is a wire connection of the fixing part 41 and the limiting rod 42 when the vehicle wheels 3 and swing arm 4 on both sides have no deflection upon normal driving.

Figure 8:
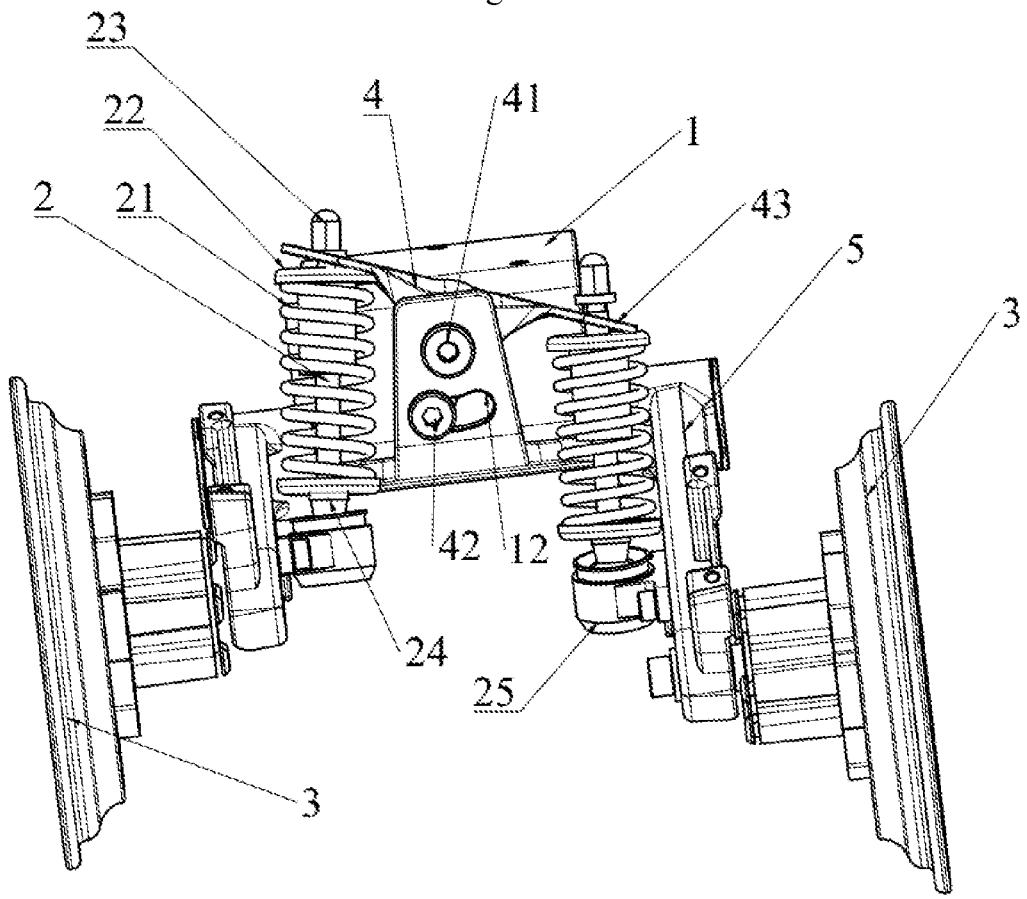
FIG. 8 shows a state diagram of the vehicle suspension system in embodiment one of this invention when it turns to the left.

When the scooter turns left or the pedal 6 is pressed to cause the frame 1 to deflect left as shown in FIG. 8, the frame 1 turns left to drive the rocker arms 5 on both sides to be deflect to the left, then the rocker arms 5 on both sides drive the vehicle wheels 3 on both sides to be deflect to the left. At that time, a support point of the scooter is at the vehicle wheels 3 on the left. Since the vehicle wheels 3 on the left side and the spherical shell 25 on the left are on both sides of the left rocker arm 5, the spherical shell 25 on the left moves up when the vehicle wheels 3 on the left presses down, and the damper 2 on the left supports upward and the through-hole 43 on the left side rises and controls the whole swing arm 4 in rotation to the right side through the fixing part 41, and the through-hole 43 on the right side presses down. At this time, the limiting rod 42 is on the left side of the limiting hole 12, the coil spring 21 on the right could generate certain a compressive deformation by pressing down the damper 2 on the right, and the pressure transmitting to the damper 2 on the right is applied to the spherical shell 25 on the right through the damper 2 on the right. The vehicle wheels 3 on the right turns to the left under the action of the rocker arm 5 on the right side and is pressed down by the pressure and is close to the ground. Thus, a probability of slipping or turning the scooter due to the fact that the wheels 3 on the right is off the ground when the scooter is tilted to the left is reduced, and the scooter turning safety is further improved.

When the scooter turns right or causes the frame 1 to deflect right, the suspension system change is opposite to the deflection to the left. Finally, the vehicle wheels 3 on both sides turns to the right, and the vehicle wheels 3 on the left is pressed on the ground.

FIG. 10 is a state diagram for a scooter upon folding in the embodiment. The scooter reduces in volume upon folding for convenience of carrying.

Besides, the technology and principle known by the technicians in the field are not expanded excessively in this invention. The structure or shape of parts adopted in the specific implementation method of this invention could not restrict the technical scheme of this invention. On the basis of this invention's conception, the technicians in this field could replace with the parts with the same or similar functions or increase other functional parts as per demand. All non-substantive improvements on the basis of this invention points are within the protection scope of this invention.

What is claimed is:

1. A vehicle suspension system, comprising a frame, a damper and a rocker arm, wherein the frame is connected with the rocker arm, the frame is also connected with the rocker arm by the damper, the system further comprises a swing arm and a limiting structure both disposed at the frame; a top of the damper is connected with the frame through the swing arm, a fixing part of the swing arm is hingedly connected with the frame, and a swing part of the swing arm cooperates with the limiting structure on the frame to define a rotation angle of the swing arm; a bottom of the damper is provided with a universal structure, the damper is connected with the rocker arm through the universal structure, the universal structure controls the damper in a free deflection, and the swing part is a limiting rod, the limiting structure is a limiting hole, and the limiting rod inserts into the limiting hole to limit an angle of the swing arm.

2. The vehicle suspension system according to claim 1, wherein the universal structure comprises a ball rod and a spherical shell, the ball rod and the spherical shell are disposed at the bottom of the damper, the ball rod and the spherical shell coordinate in connection, and the spherical shell and the rocker arm are fixed connected.

3. The vehicle suspension system according to claim 1, wherein the damper is one of a spring damper, a rubber damper, a hydraulic damper or an inflatable damper.

4. The vehicle suspension system according to claim 1, wherein the angle of the swing arm deviating from both sides in a vertical direction when moving is less than or equal to 30°.

5. The vehicle suspension system according to claim 4, wherein the damper is a spring damper, the spring damper is provided with a coil spring, both ends of the coil spring are provided with a spring cap, respectively, the spring cap is movably connected to the damper, and the top of the damper is provided with a cap nut.

6. The vehicle suspension system according to claim 5, wherein both ends of the swing arm are disposed between the spring cap and the cap nut at a top of the spring damper.

7. A vehicle, comprising at least one vehicle suspension system according to claim 1.

8. The vehicle according to claim 7, wherein the vehicle suspension system is for a rear wheel of the vehicle.

9. A vehicle, comprising at least one vehicle suspension system according to claim 2.

10. A vehicle, comprising at least one vehicle suspension system according to claim 3.

11. A vehicle, comprising at least one vehicle suspension system according to claim 4.

12. A vehicle, comprising at least one vehicle suspension system according to claim 5.

13. A vehicle, comprising at least one vehicle suspension system according to claim 6.

14. A vehicle suspension system, comprising a frame, a damper and a rocker arm, wherein the frame is connected with the rocker arm, the frame is also connected with the rocker arm by the damper, the system further comprises a swing arm and a limiting structure both disposed at the frame; a top of the damper is connected with the frame through the swing arm, a fixing part of the swing arm is hingedly connected with the frame, and a swing part of the swing arm cooperates with the limiting structure on the frame to define a rotation angle of the swing arm; a bottom of the damper is provided with a universal structure, the damper is connected with the rocker arm through the universal structure, the universal structure controls the damper in a free deflection, and the swing part is a limiting hole, the limiting structure is a limiting rod, and the limiting rod inserts into the limiting hole to limit an angle of the swing arm.

15. The vehicle suspension system according to claim 14, wherein the angle of the swing arm deviating from both sides in a vertical direction when moving is less than or equal to 30°.

16. The vehicle suspension system according to claim 15, wherein the damper is a spring damper, the spring damper is provided with a coil spring, both ends of the coil spring are provided with a spring cap, respectively, the spring cap is movably connected to the damper, and the top of the damper is provided with a cap nut.

17. The vehicle suspension system according to claim 16, wherein both ends of the swing arm are disposed between the spring cap and the cap nut at a top of the spring damper.

18. A vehicle, comprising at least one vehicle suspension system according to claim 14.

* * * * *